United States Patent [19]
Paoli

[11] 3,851,828
[45] Dec. 3, 1974

[54] MACHINE FOR PROCESSING BONE-IN MEAT CUTS

[76] Inventor: Stephen A. Paoli, Stephen Paoli Manufacturing Company, 520 Sixth St., Rockford, Ill. 61108

[22] Filed: Jan. 22, 1973

[21] Appl. No.: 325,825

[52] U.S. Cl.................................. 241/68, 241/93
[51] Int. Cl... A22c 17/00, A22c 25/16, B02c 18/00
[58] Field of Search.......... 241/68, 83, 91, 93, 220, 241/221, 254, 260.1

[56] References Cited
UNITED STATES PATENTS

| | | | |
|---|---|---|---|
| 3,266,542 | 8/1966 | Paoli | 241/93 X |
| 3,524,487 | 8/1970 | Paoli | 241/68 |
| 3,552,461 | 1/1971 | Paoli | 241/68 |

Primary Examiner—Roy Lake
Assistant Examiner—E. F. Desmond
Attorney, Agent, or Firm—Wolfe, Hubbard, Leydig, Voit & Osann, Ltd.

[57] ABSTRACT

An improved mechanical separator machine of high efficiency which is adapted to accept as raw material bone-in cuts of meat, poultry or fish. In a single continuous operation, the machine breaks the bone-in meat cuts into a coarse agglomeration of hard and soft tissues, separates from the agglomeration comminuted meat without perceptible bone, collects the comminuted meat, and expels the bone and other hard tissues as waste.

12 Claims, 15 Drawing Figures

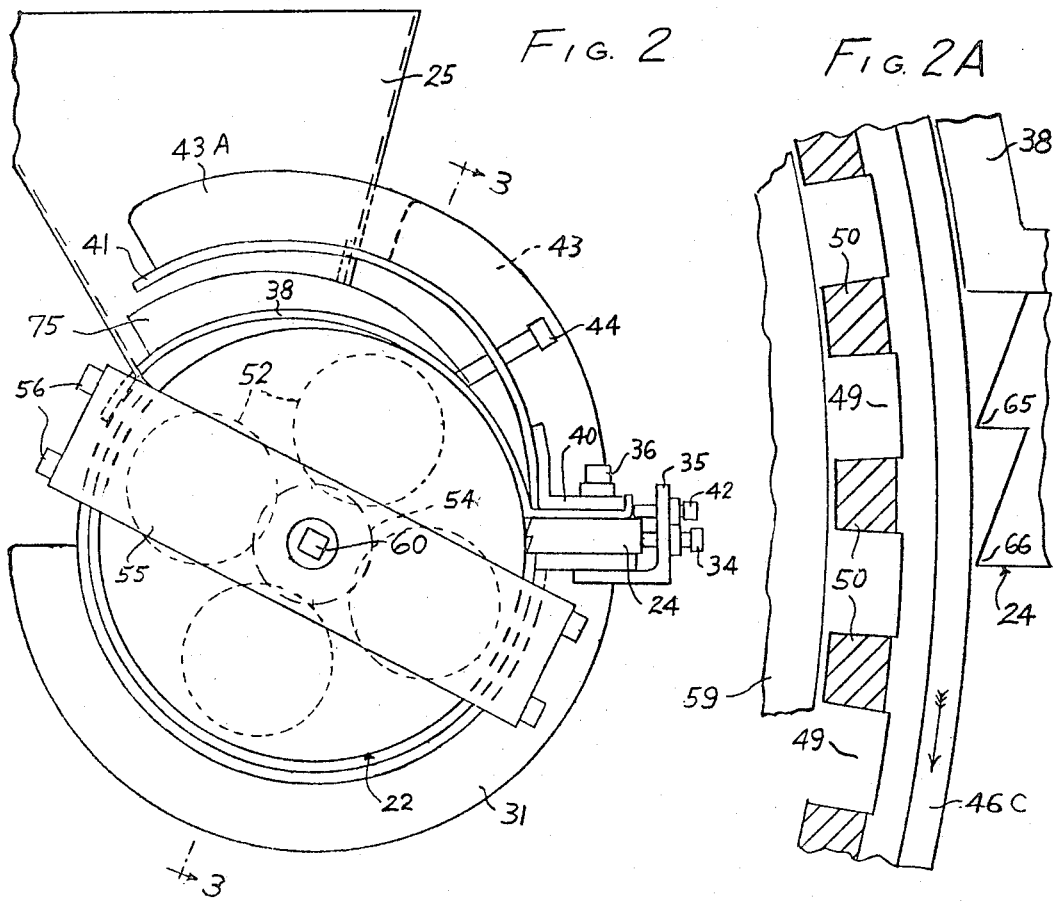
Fig. 2
Fig. 2A
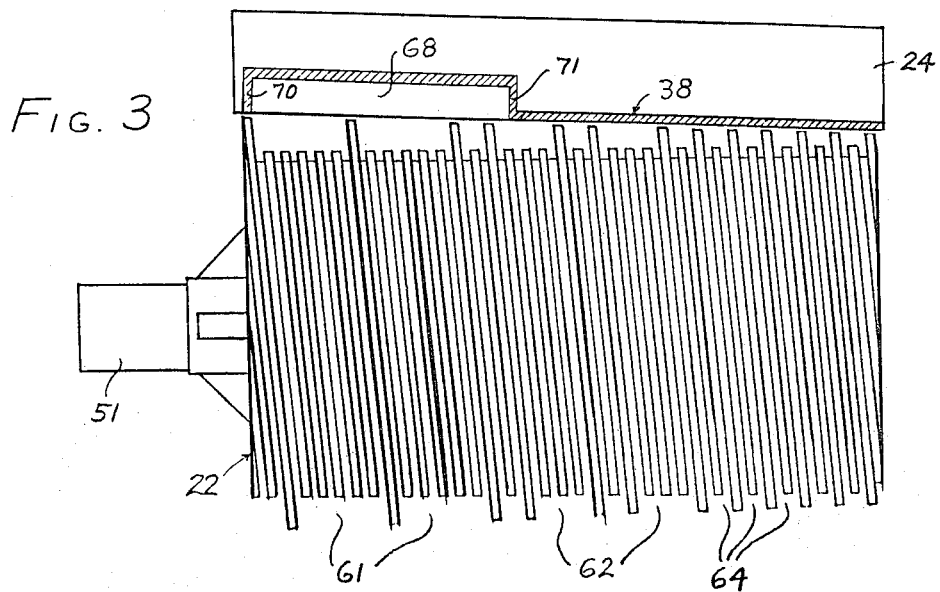
Fig. 3

MACHINE FOR PROCESSING BONE-IN MEAT CUTS

DESCRIPTION OF THE INVENTION

The present invention relates generally to food processing machinery and, more specifically, to an improved mechanical separator machine which utilizes bone-in cuts of meat, poultry and fish as raw material and performs a continuous mechanical separation of boneless comminuted meat free of all perceptible bone. The term "perceptible bone," in this context, means perceptible to the touch when a pinch of the comminuted meat is pressed between the fingers.

The invention described herein represents an improvement over the machines disclosed in my prior U.S. Pat. Nos.: 3,266,542 issued Aug. 16, 1966; 3,524,487 issued Aug. 18, 1970; 3,552,461 issued Jan. 5, 1971; and 3,659,638 issued May 2, 1972.

The machines disclosed in my aforesaid prior patents are adapted to separate comminuted meat from perceptible bone. Such machines are, however, limited in that they cannot accept bone-in meat cuts as raw material. In order to place bone-in meat cuts into acceptable form for the prior machines, they must first be reduced to a coarse agglomeration of hard and soft tissues by means of a coarse grinder. This introduces an additional step which has a number of disadvantages.

Conventional coarse grinders subject the product to undesirable temperature rises due to frictional heat which results largely from the metal to metal contact of the grinder knife against the orifice plate. The cutting action in the grinder also tends to change the fibrous texture of the finished meat, increasing the emulsion-like content which is an undesirable characteristic for certain end products such as hamburger. Quite aside from the effect on the product itself, the use of the coarse grinder detracts from the economy of mechanical deboning because of the additional labor, equipment and time involved.

One object of the present invention is to provide a machine adapted to accept, as raw material, bone-in cuts of meat, poultry and fish and, in a continuous operation, to reduce such material to a coarse agglomeration of hard and soft tissues, to separate therefrom the comminuted meat as an end product, and to eject the perceptible bone and other hard tissues.

Another object is to provide a machine of the character set forth adapted to simultaneously break the bone-in meat cuts into a coarse agglomeration of hard and soft tissues while separating therefrom the boneless comminuted meat.

A further object of the invention is to provide a machine of the foregoing type adapted to effect continuous production of boneless comminuted meat with negligible temperature rise in the product.

Another object is to provide a machine of the character set forth above and adapted to operate with substantially higher yield and efficiency than machines of the type heretofore known.

Other objects and advantages will become apparent as the following description proceeds, taken together with the accompanying drawings, in which:

FIG. 2 is an end elevational view, on a reduced scale, of the machine shown in FIG. 1. FIG. 2A is an enlarged detail view showing the rotor, pressure bar and regulator plate clearances.

FIG. 3 is a fragmentary sectional view, partially in diagrammatic form, through the illustrative machine, taken in the plane of the line 3—3 in FIG. 2.

Figure 1:
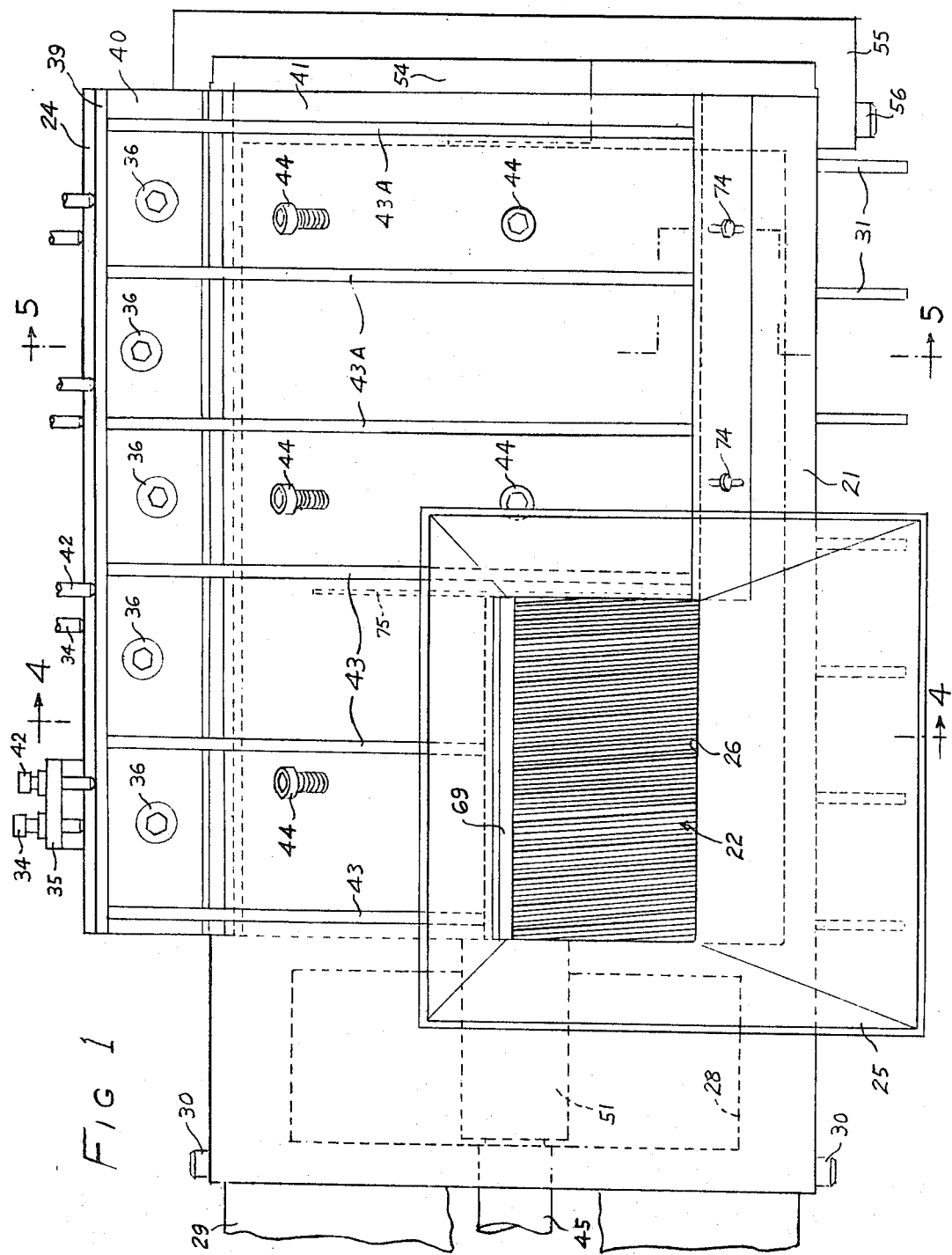
FIG. 1 is a plan view of an illustrative machine exemplifying the present invention.
Figure 4:
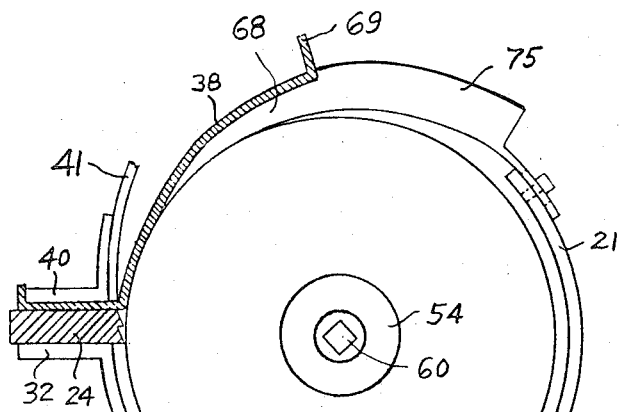
Figure 5:
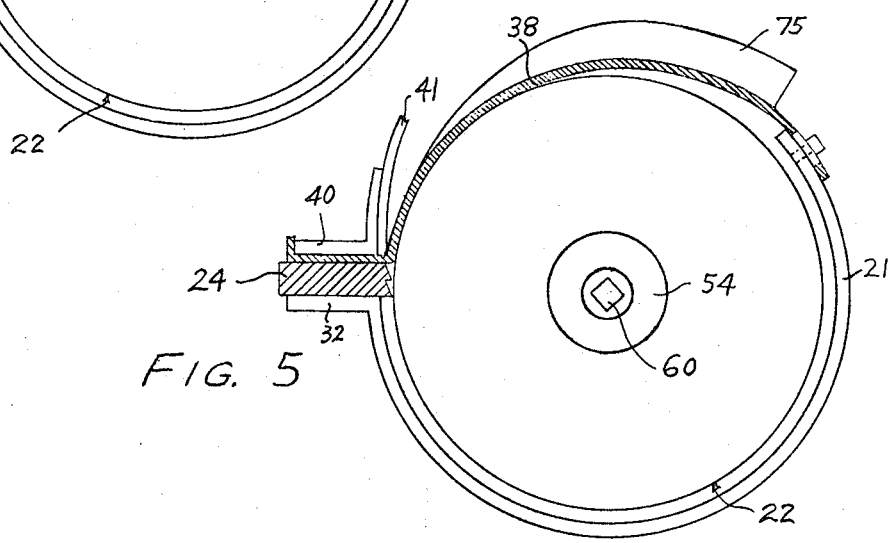

FIGS. 4 and 5 are fragmentary transverse sectional views of the illustrative machine taken respectively in the plane of the lines 4—4 and 5—5 in FIG. 1.

Figure 6:
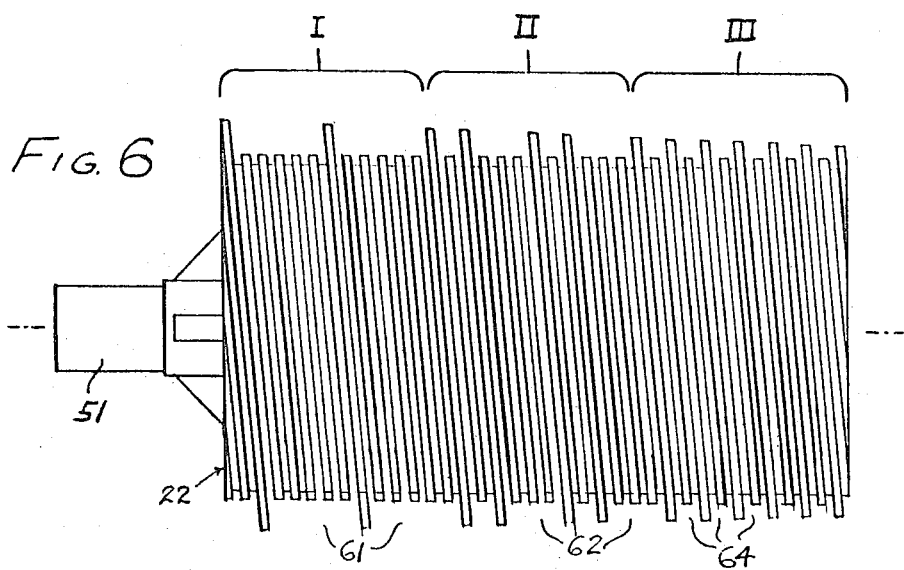

FIG. 6 is a diagrammatic view of the rotor of the illustrative machine of FIG. 1.

Figure 7:
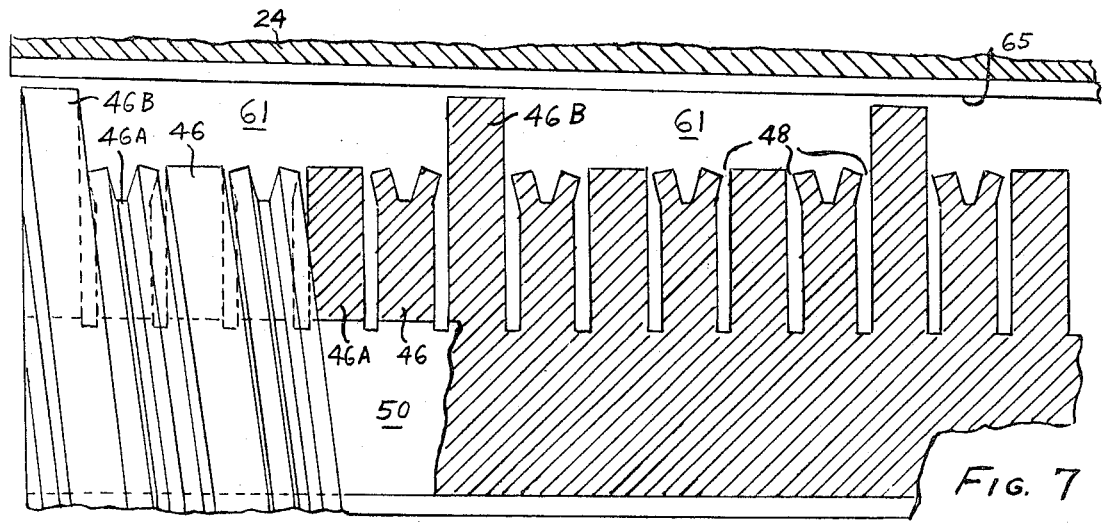
Figure 8:
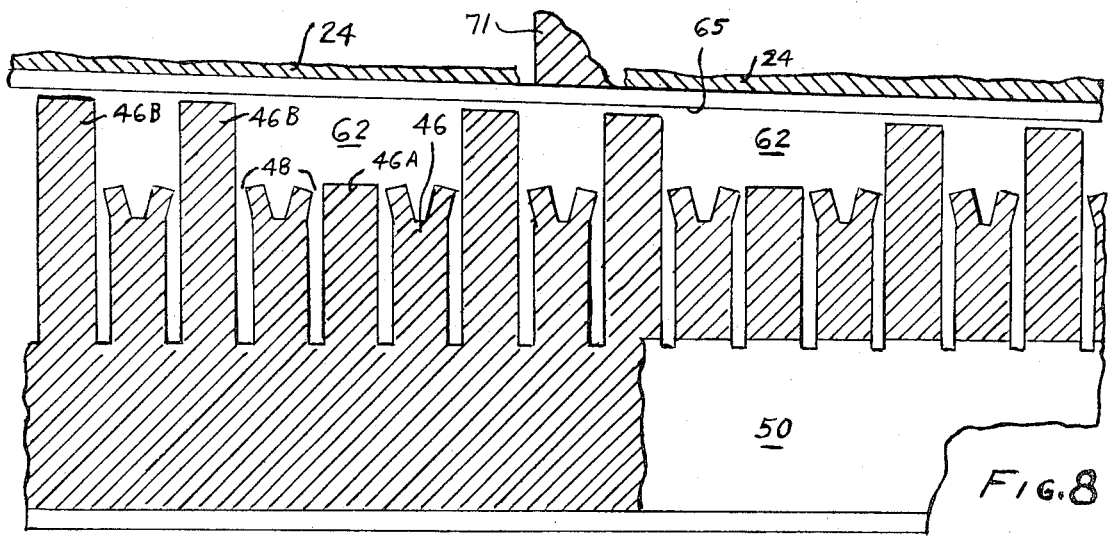
Figure 9:
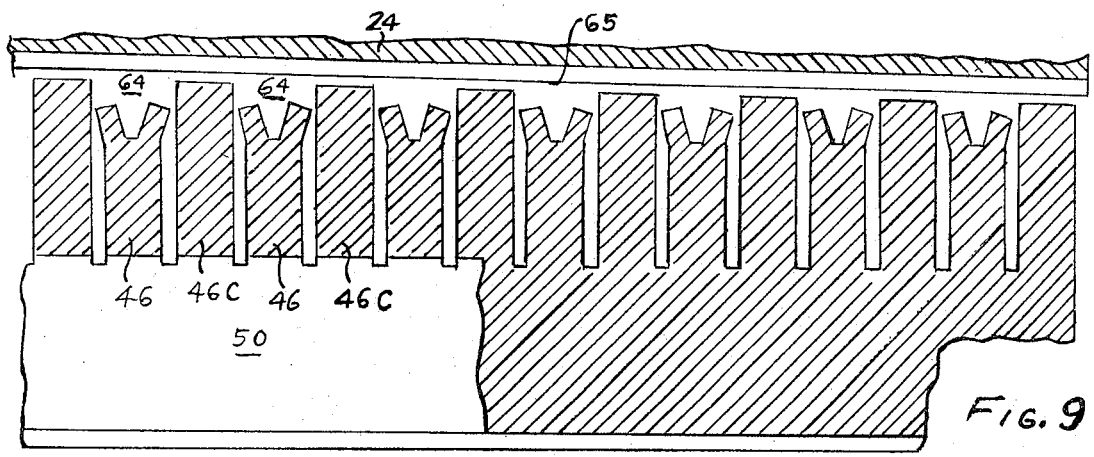
Figure 12:
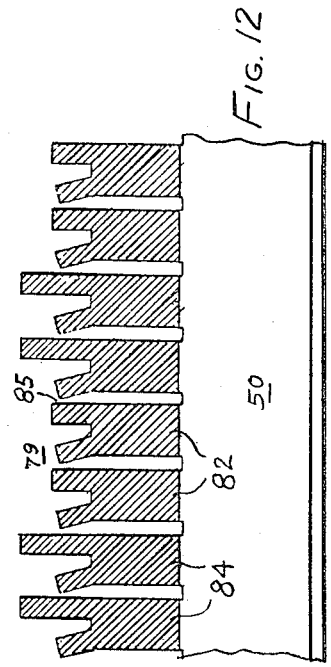
Figure 13:
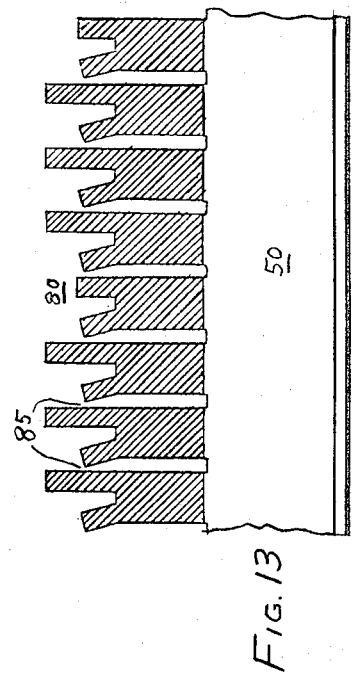
Figure 14:
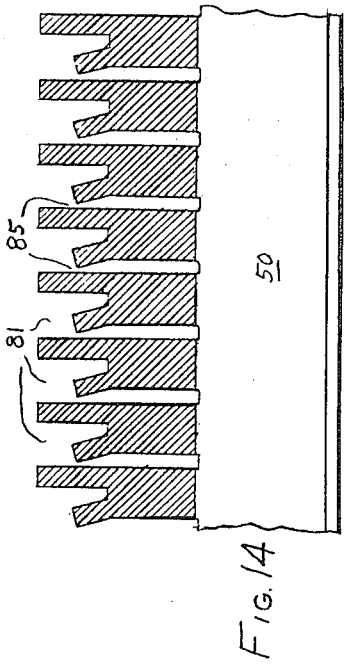
Figure 11:
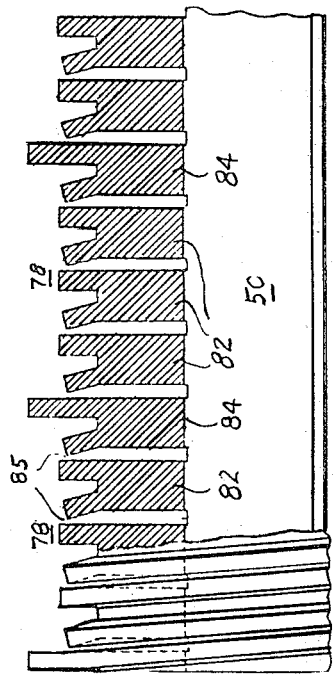

FIGS. 7, 8 and 9 are enlarged, fragmentary sectional views detailing portions of the rotor of FIG. 6.

Figure 10:
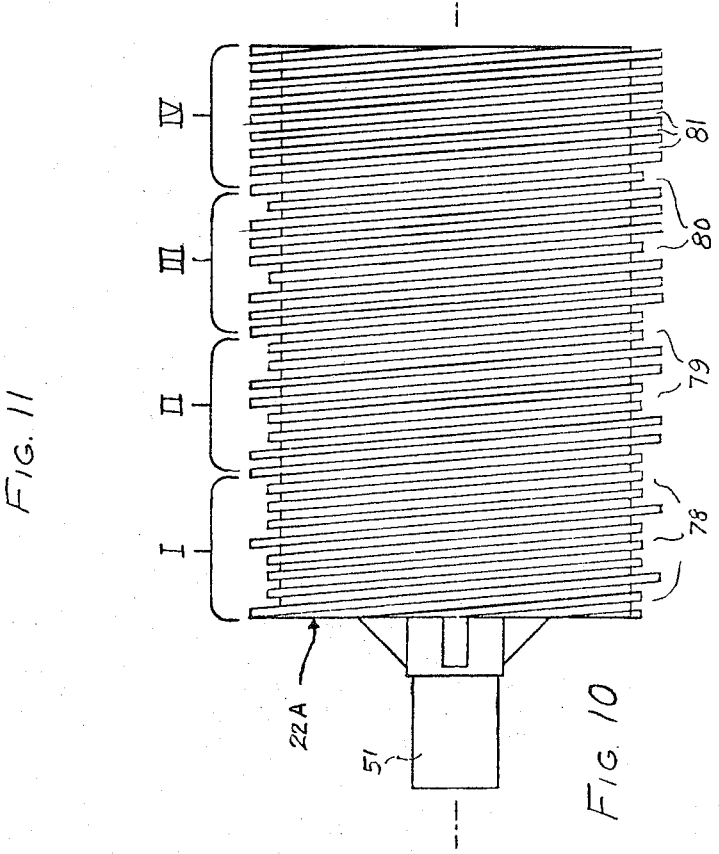

FIG. 10 is a diagrammatic view similar to FIG. 6 showing another form of rotor operable in the illustrative machine of FIG. 1.

FIGS. 11, 12, 13 and 14 are enlarged fragmentary sectional views detailing portions of the rotor of FIG. 10.

While the invention is susceptible of various modifications and alternative constructions, certain illustrative embodiments have been shown in the drawings and will be described below in considerable detail. It should be understood, however, that there is no intention to limit the invention to the specific forms described but, on the contrary, the intention is to cover all modifications, alternative constructions and equivalents falling within the scope of the appended claims.

Referring more specifically to FIGS. 1 through 9, the invention is there exemplified in an illustrative mechanical separator machine 20. The machine 20 is somewhat similar in organization to the deboning machines disclosed in my prior U.S. Pat. Nos. 3,266,542, 3,524,487, 3,552,461 and 3,659,638, supra. The machine 20 differs significantly, however, in that it is capable of accepting raw material in the form of bone-in cuts of meat, poultry and fish which would be impossible to handle in the prior machines. The machine 20 comprises a generally cylindrical casing 21 containing a power driven rotor 22 and a cooperating pressure bar 24. Raw material in the form of bone-in meat cuts is fed into the machine via hopper 25 and feed opening 26 in the top of the casing. In one continuous operation, the raw material is simultaneously broken into an agglomeration of hard and soft tissues and separated into boneless comminuted meat and waste tissues. The boneless comminuted meat passes into the interior of the rotor and is discharged via an aperture 28 at the bottom of the casing near the driven end of the rotor. The waste tissues, comprising bone, sinew, cartilage and stringy connective tissue, are trapped on the outer periphery of the rotor and discharged adjacent the outboard end thereof.

The casing 21 (FIGS. 1, 2, 4 and 5) has in this instance a generally cylindrical tubular configuration and is mounted cantilever fashion on the drive unit 29. It is secured to the latter as by means of cap screws 30. Longitudinally spaced arcuate stiffener ribs 31 reinforce the casing against deflection, due for example, to concentrations of lateral thrust in the vicinity of the pressure bar.

The pressure bar 24 (FIGS. 1, 2, 4 and 5) is mounted on a base flange 32 which turns outwardly from the casing wall. The flange 32 is situated so that the pressure bar 24 will be disposed with its medial plane in or near coincidence with the horizontal axial plane of the rotor 22. The pressure bar 24 may be adjusted for clearance with the rotor as by means of adjusting screws 34 mounted in brackets 35 fixed to the base flange 32. The pressure bar is secured in adjusted position as by means of hold-down bolts 36 which pass through clearance slots in the bar and engage tapped holes in the base flange. To permit the pressure bar to be returned to its precise adjusted position repeatedly after disassembly of the machine for cleaning, the pressure bar may be provided with dowel pins (not shown) which register with the base flange.

The machine 20 is equipped with a regulator plate 38 (FIGS. 2 – 5) adapted to control the breaking and feeding of raw material in cooperation with the rotor 22 and pressure bar 24. The plate 38 is somewhat similar to the one disclosed in my prior U.S. Pat. No. 3,552,461, supra, but differs in configuration and mode of operation with respect to the rotor of the machine. The main area of the plate 38 is of generally concave form and includes a mounting flange 39 along its lower edge. As shown in FIG. 2, the regulator plate mounting flange 39 is clamped between mounting flange 40 of an arcuate segment 41 of the machine casing wall and the top of the pressure bar 24. The plate 38 and casing wall segment 41 are retained in place by the hold-down bolts 36. The clearance and attitude of the regulator plate 38 with respect to the rotor 22 may be varied as by means of adjusting screws 42 carried by the brackets 35 and by screws 44 mounted in casing wall segment 41. The latter may be reinforced as by means of arcuate stiffener ribs 43, 43A.

As noted earlier herein, the rotor 22 is journaled in the casing 21 (FIGS. 1, 2 and 3) and is power driven from output shaft 45 of the drive unit 29 which may, for example, be a motor driven reduction gear. The rotor is of generally cylindrical form and is fashioned with a plurality of helical cutting elements 46, 46A, 46B (FIGS. 7, 8 and 9) defining constricted helical grooves 48 communicating with the interior of the rotor after the manner disclosed in my prior patents, supra. At or adjacent to the pressure face on the outer peripheral surface of the rotor, the helical grooves 48 are constricted to a width on the order of 0.008 inch which is somewhat smaller than the average diameter of the smallest hard tissue fragments to be removed. The rotor has a plurality of longitudinal slots 49 in its interior wall extending to the root diameter of the grooves 48 and connecting therewith. The slots 49 define a corresponding series of longitudinal lands 50 in the rotor wall and which are integral with the cutting elements 46, 46A, 46B for structural rigidity.

The inboard end of the rotor 22 adjacent the drive unit 29 is supported by means of hub 51 and associated end plate, the latter having a plurality of large meat discharge apertures 52 (FIG. 2). The outboard end of the rotor is journaled in a main support bearing 54 mounted on a diametrical bracket 55 which extends across the end of the casing. The bracket 55 is detachably secured to the casing 21 as by means of cap screws 56. The outer end of the rotor 22 is centered in the bearing 54 and closed by means of a solid end plate 58. The rotor includes a fixed auger 59 for guiding the boneless comminuted meat from its interior through the meat discharge apertures 52, from which it drops through the casing discharge aperture 28 to a collecting receptacle. The bracket 55 includes a fixed socket which engages the squared outer end 60 of the auger shaft.

Provision is made in the machine 20 for accepting raw material in the form of bone-in cuts of meat, poultry or fish and simultaneously breaking such material into a coarse agglomeration of fragmented hard and soft tissues while separating therefrom the boneless comminuted meat. This is accomplished by modification in the structure of the rotor 22 and regulator plate 38 resulting in a novel mode of operation of the machine derived from coaction between the rotor 22, the pressure bar 24 and the regulator plate 38.

Reference should be made here to the diagrammatic view of the rotor 22 in FIG. 6, which shows the helical cutting elements in exaggerated scale and simplified form for purposes of clearer understanding. It will, accordingly, be noted that certain ones of the helical cutting elements 46B are formed with substantially greater diameter than the remaining cutting elements 46, 46A and arranged in a predetermined pattern on the rotor according to axial spacing. Such pattern in this instance comprises three consecutive zones designated I, II and III, respectively, each occupying about one-third of the rotor. Zone I, which underlies the hopper 25 and feed opening 26, has the greatest axial spacing between the larger diameter cutting elements 46B and, as shown in FIG. 7, defines a plurality of large helical pressure pockets 61 on the outer peripheral surface of the rotor. A rotor approximately 12 inches in diameter and 18 inches in length may, for example, have nine such pockets 61 in Zone I. Zone II, which may partially underlie the hopper and feed opening, has less axial spacing between the larger diameter cutting elements 46B. As shown in FIG. 8, this spacing defines a plurality of helical pressure pockets 62, narrower than the pockets 61, on the outer peripheral surface of the rotor. The exemplary 12 inch rotor referred to above may also have nine of the pockets 62 in Zone II. Zone III, as shown in FIG. 9, comprises helical cutting elements 46C, 46A which are proportioned and spaced somewhat after the manner of the cutting elements disclosed in my prior U.S. Pat. No. 3,659,638, supra. These elements define helical pressure pockets 64 substantially narrower in width than the pockets 62. The exemplary 12 inch rotor above referred to may have 27 of the pressure pockets 64 in Zone III.

In order to achieve a further gradation in the diameter of the cutting elements 46B, 46C and the size of the pressure pockets 61, 62, 64, from the beginning of Zone I to the end of Zone III, the outer diameter of the rotor may be tapered from its driven end toward its outboard end. Such taper, which is shown exaggerated in FIGS. 3 and 6 and appears more accurately in FIGS. 7, 8 and 9, may be on the order of 0.100 inch on the diameter in the exemplary 12 inch diameter rotor mentioned above.

The regulator plate 38 (FIGS. 2–5), as noted earlier herein, is adapted to control the breaking and feeding of raw material in cooperation with the rotor 22 and pressure bar 24. It is concave in form and constructed of relatively heavy sheet metal so as to provide substantial inherent stiffness. The plate 38 is rigidly clamped to the pressure bar and wrapped around the upper portion of the rotor in closely spaced nested relation therewith. The spacing of the plate 38 with respect to the rotor corresponds to the rotor clearance of the pressure bar which in this instance happens to be of the double apex type with each of the apexes 65, 66 having a rotor clearance of 0.004 – .005 inches.

In the vicinity of the hopper 25, the regulator plate 38 is formed with a relatively large arcuate pocket 68 extending from the feed opening 26 downwardly along the rotor but terminating above the pressure bar. Above the entrance to the pocket 68, there is an upstanding flange 69 which extends up into the hopper 25 (FIG. 1). The side of the pocket 68 adjacent the inboard end of the rotor is defined by an arcuate abutment 70. The opposite side of the pocket 68 is defined by another arcuate abutment 71 which represents the transition between the pocket 68 and the spreader face 72 of the regulator plate. The latter extends in closely spaced relation with the rotor over an area, excluding pocket 68, corresponding approximately to the quadrant of the rotor above and adjacent to the pressure bar. For structural rigidity, that portion of the regulator plate from the pocket 68 to the outboard end of the rotor may be extended past the hopper and into overlapping relation with the machine casing. It is adjustably secured to the casing as by means of cap screws 74 which engage corresponding slots in the regulator plate. This portion of the plate may be further reinforced by means of an upstanding arcuate flange 76 adjacent the hopper (FIGS. 1, 2, 4, 5).

By reason of the structure just described, raw material such as poultry necks or other bone-in meat cuts, fed into the hopper 25, is immediately engaged by the rotor 22. The latter subjects the material to a downward movement pressing it into the constricted lower end of the arcuate pocket 68 and into one or more of the large pressure pockets 61 in Zone I of the rotor. Some meat begins to separate through the constricted helical grooves 48 of the rotor. At the same time, spaced apart large diameter helical cutting elements 46B bite into raw material and force the latter to move toward the outboard end of the machine. The cutting elements effect sufficient biting action on the raw material to force it against the arcuate abutment 71 between the pocket 68 and the spreader face 72 of the regulator plate. This results in breaking the raw material against the abutment 71, producing a coarse agglomeration of hard and soft tissues and at the same time separating boneless comminuted meat therefrom. By coaction of the rotor and regulator plate 38, the coarse agglomeration of material is then spread out over a progressively larger portion of the area of the rotor, and subjected to pressure from three different directions, greatly enhancing the continuous mechanical separation performed by the machine. For example, the pitch of the convolutions of the rotor tends to press the material axially toward the outboard end of the rotor. The motion of the rotor itself tends to press the material downwardly along the peripheral surface of the rotor toward the pressure bar. In addition, the graduated spacing between the larger diameter helical cutting elements 46B, 46C, and hence the graduated width of the pressure pockets 61, 62, 64, decreases progressively toward the outer end of the rotor. All of this tends to maintain the continuous separating action, driving the comminuted meat into the interior of the rotor rapidly with a minimum of friction and hence negligible temperature rise. The close spacing of the pressure plate 38 maintains separation over a significantly larger area of the rotor than achieved heretofore, thus contributing to the high yield and efficiency of the machine.

The rotor 22 is structurally superior to those disclosed in my prior patents, supra. When installed in the machine 20 as described above and operated at approximately 125 RPM, the machine is adapted to accept and process a great variety of bone-in meat cuts. These include chicken necks, backs and drumsticks, turkey necks, drumsticks and wings, and pork necks and backs. Representative yields of boneless comminuted meat derived from chicken necks, for example, run between 80 and 90 percent by weight.

Turning now to FIGS. 10 through 14, there is shown a modified form of rotor 22A also embodying the present invention and operable in the machine 20. As indicated in the simplified diagrammatic view in FIG. 10, the rotor 22A has a series of arcuate pressure pockets 78, 79, 80, 81 defined in its outer peripheral surface between the helical cutting elements 82, 84. The pressure pockets have constricted helical grooves 85 adjacent their bottom surface which communicate with the interior of the rotor and are adapted to pass boneless comminuted meat thereinto. These grooves, like the grooves 48 of the rotor 22, have a throat clearance of 0.006 – 0.008 inches. The pressure pockets are of decreasing width from the inboard or hub end 51 of the rotor 22A toward its outboard end and in this case are arranged in four zones designated by the numerals I through IV.

The helical cutting elements 82, 84 of the rotor 22A are somewhat similar to those described in my prior U.S. Pat. No. 3,524,487, supra, except for the fact that the straight upstanding rib portions are of larger diameter than those of said patent. The actual configuration of the helical cutting elements in each of Zones I, II, III and IV is shown respectively in FIGS. 11, 12, 13 and 14. The arcuate pressure pockets 78, 79 and 80 are formed by the graduated spacing of the larger diameter cutting elements 82. In the present instance, the rotor 22A is not tapered but it may be fashioned with a taper from its inboard end toward its outboard end. Such taper may be on the order of 0.100 inches for a rotor approximately 12 inches in diameter and 18 inches in length.

The rotor 22A when installed in the machine 20 bears the same operational relationship to the pressure bar 24 and regulator plate 38 as the rotor 22, and utilizes the same clearances. It operates with high efficiency on products such as chicken necks, backs or drumsticks, simultaneously breaking this raw material against the abutment 71 and separating boneless comminuted meat therefrom.

I claim:

1. A machine for processing bone-in cuts of meat, poultry or fish in one continuous operation which includes reducing said material to a coarse agglomeration of fragmented hard and soft tissues while simultaneously separating therefrom boneless comminuted meat free from perceptible bone and other hard tissues, said machine comprising the combination of:
   a. a machine casing having a feeding opening for raw material;
   b. a hollow power driven rotor journaled within said casing, said rotor having a driven or inboard end and an outboard end;
   c. a plurality of axially spaced helical cutting elements in said rotor defining a plurality of constricted helical grooves communicating between the exterior and the interior of said rotor;

d. certain of said helical cutting elements being of substantially larger diameter than the remaining ones of said cutting elements and being disposed in graduated spaced relation on said rotor with graduated width pressure pockets defined therebetween;

e. a pressure bar fixed to said casing in closely spaced relation with the outer peripheral surface of said rotor;

f. a regulator place fixed to said pressure bar and extending upwardly therefrom in closely spaced nested relation with the outer peripheral surface of said rotor;

g. means defining a generally arcuate pocket in said regulator plate adjacent said feeding opening;

h. an arcuate abutment on the side of said pocket toward the outboard end of said rotor;

i. said abutment being constructed and arranged to coact with said larger diameter helical cutting elements and the pressure pockets therebetween to break said raw material into an agglomeration of hard and soft tissues while comminuted meat is being separated therefrom.

2. A machine for processing bone-in cuts of meat, poultry or fish as raw material in one continuous operation which includes reducing said material to a coarse agglomeration of fragmented hard and soft tissues, said machine comprising, in combination:

a. a machine casing having a feeding opening for raw material;

b. a hollow power driven rotor journaled within said casing;

c. a plurality of axially spaced helical cutting elements in said rotor defining a plurality of constricted helical grooves communicating between the exterior and the interior of said rotor;

d. a pressure bar fixed to said casing in closely spaced relation with the outer peripheral surface of said rotor;

e. a regulator plate fixed to said pressure bar and extending upwardly therefrom in closely spaced nested relation with the outer peripheral surface of said rotor;

f. means defining a generally arcuate pocket in said regulator plate adjacent said feeding opening;

g. said rotor, regulator plate and pressure bar being constructed and arranged for simultaneously breaking said raw material into a coarse agglomeration of fragmented hard and soft tissues while separating therefrom comminuted meat free of perceptible bone.

3. A machine for processing bone-in cuts of meat, poultry or fish comprising, in combination:

a. means for introducing the bone-in cuts of meat as raw material;

b. means for simultaneously breaking said raw material into a coarse agglomeration of fragmented hard and soft tissues while separating therefrom comminuted meat free of perceptible bone;

c. means for discharging the separated comminuted meat;

d. means for discharging the separated perceptible bone and other hard tissues as waste.

4. A machine as set forth in claim 1 wherein said regulator plate and said pressure bar have approximately the same running clearance with respect to said rotor.

5. A machine as set forth in claim 4, wherein said running clearance is 0.004 – 0.005 inches.

6. A machine as set forth in claim 1, wherein said regulator plate, excluding said arcuate pocket, extends in closely spaced relation with said rotor over an area corresponding approximately to the quadrant of the rotor above and adjacent to said pressure bar.

7. A machine as set forth in claim 1, wherein said rotor is graduated axially into a plurality of zones each including said larger diameter cutting elements and pressure pockets, the axial spacing of said larger diameter cutting elements and axial width of said pressure pockets decreasing toward the outboard end of said rotor.

8. A machine as set forth in claim 1, wherein the diameter of said rotor is tapered from its inboard end toward its outboard end.

9. A machine as set forth in claim 8, wherein the taper of said rotor is approximately 0.100 inches for a rotor 12 inches in diameter and 18 inches in length.

10. A machine as set forth in claim 2, wherein said breaking means includes certain of said helical cutting elements of larger diameter than the others and disposed in graduated spaced relation on the rotor defining pressure pockets of graduated width thereon, and a fixed arcuate abutment on the downstream side of said pocket disposed in closely spaced relation with said helical cutting elements.

11. A machine as set forth in claim 3, wherein said breaking means includes axially spaced helical cutting elements rotatably disposed with respect to a fixed transverse abutment having a close running clearance therewith.

12. A machine as set forth in claim 2, wherein that portion of said regulator plate adjacent said arcuate pocket is extended over the top of said rotor into overlapping relation with said casing and is adjustably secured to the latter.

* * * * *